Jan. 12, 1960   J. E. HECKETHORN ET AL   2,920,638
VALVED CONTAINER CAP HAVING A FRANGIBLE DISK THEREIN
Filed Nov. 5, 1956
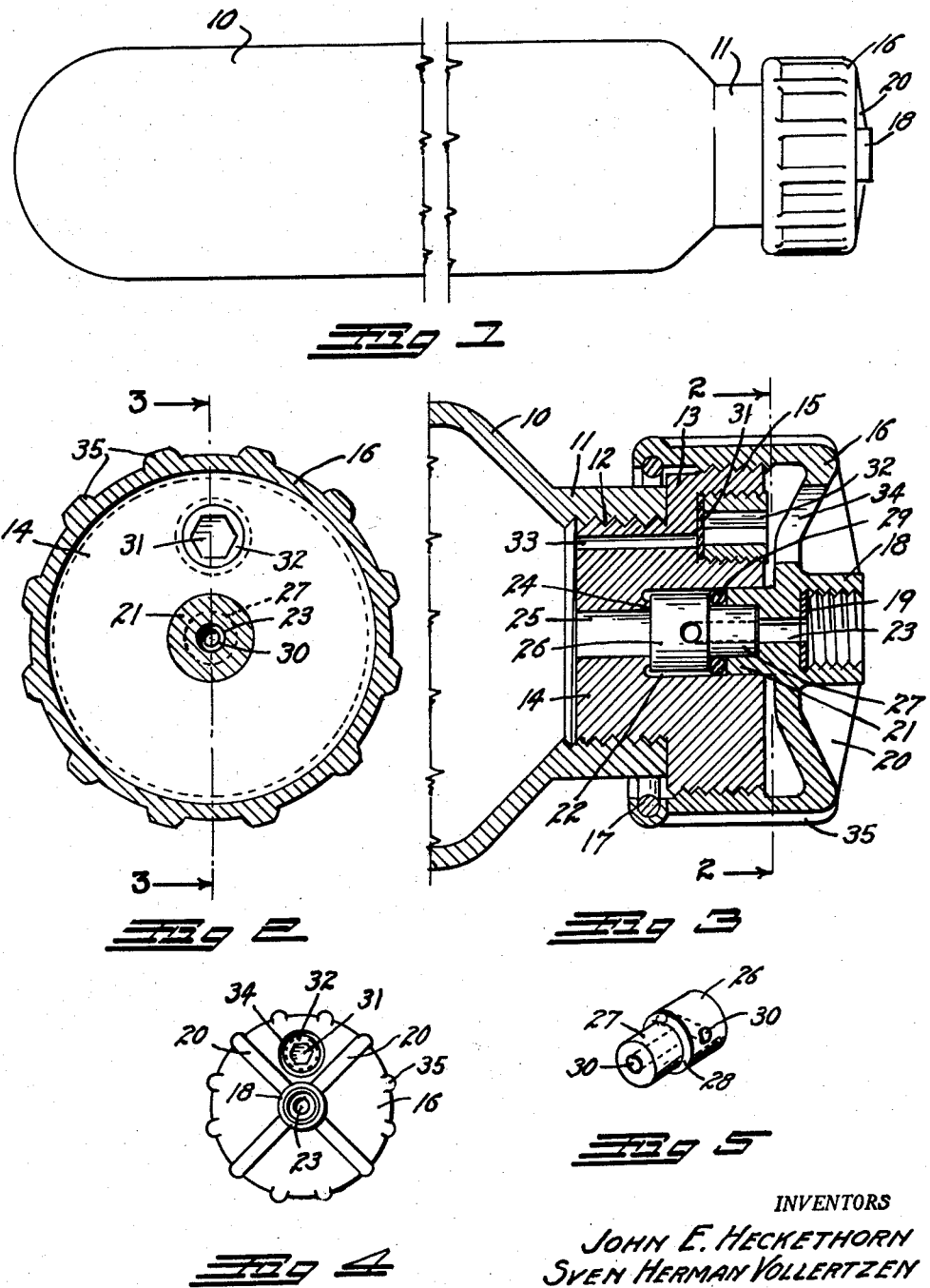
INVENTORS
JOHN E. HECKETHORN
SVEN HERMAN VOLLERTZEN
By
ATTORNEY United States Patent Office 2,920,638
Patented Jan. 12, 1960

2,920,638

VALVED CONTAINER CAP HAVING A FRANGIBLE DISK THEREIN

John E. Heckethorn, Denver, and Sven Herman Vollertzen, Littleton, Colo., assignors to Heckethorn Manufacturing & Supply Co., Littleton, Colo., a corporation of Colorado Application November 5, 1956, Serial No. 620,229

1 Claim. (Cl. 137—68)

This invention relates to a dispensing valve for pressure bottles, and has for its principal object the provision of a simple, highly efficient dispensing valve for use on a compressed gas bottle of the type designed to be carried in an automotive vehicle for tire inflation purposes. Such bottles are designed for holding the compressed gas, more particularly carbon dioxide, at extremely high pressure, and the dispensing valve must not only withstand the extreme pressure for long periods of disuse without leakage, but must withstand an exceedingly rough treatment in tool boxes, vehicle trunks, garages and upon the highway.

The principal object of the invention is to provide a valve of this type which will successfully withstand rough treatment and which will insure a perfect seal on the bottle during long periods of disuse.

Another object of the invention is to provide a pressure bottle valve which can be quickly and easily applied to a conventional vehicle tire valve for direct inflation of a vehicle tire or to an inflation hose of the type usually employed for inflating vehicle tires, and to provide means for controlling and regulating the flow of gas to the tire.

A further object is to provide the valve with a safety relief device which will release the gas should the bottle pressure increase to a dangerous point as a result of external heating.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view, partially broken away, of a conventional compressed gas bottle illustrating the improved valve in place thereon;

Fig. 2 is an enlarged cross-section through the valve, taken on the line 2—2, Fig. 3;

Fig. 3 is a similarly enlarged longitudinal section through the valve, taken on the line 3—3, Fig. 2; and Fig. 4 is an end view of the valve of Fig. 1.

Fig. 5 is an isometric view of the valve plug.

In the drawing a conventional compressed gas bottle is illustrated at 10 having the usual filling neck 11 provided with internal threads 12.

The improved dispensing valve employs a cylindrical valve body 13 formed with a threaded nipple portion 14 of reduced diameter which is adapted to be screwed into the threads 12 of the neck 11 so that the valve body will be clamped against the face of the neck 11, as shown in Fig. 3. External threads 15 are formed on the body to receive an internally threaded, cup-shaped cap 16. The cap 16 is prevented from being completely removed from the body 13 by means of a snap ring 17 which is removably fitted into an internal ring groove indented within the open extremity of the cap 16 so that it will contact the valve body 13 to limit the unscrewing movement of the cap.

The cap 16 is formed with an external, internally threaded coupling sleeve 18 which may be screwed directly over a conventional tire valve or into which a male coupling of a conventional pressure hose may be threaded. The sleeve is provided with a suitable gasket 19 for sealing the valve or coupling therein. The closed extremity or head of the cap 16 is centrally indented to protect the sleeve from being damaged by external contacts. The sleeve is still further reinforced and protected by means of a plurality of ribs 20 extending from the head of the cap.

An axially positioned, cylindrical stem portion 21 projects inwardly from the internal surface of the head of the cap. The stem portion 21 is slidably fitted into a cylindrical valve socket 22 formed in the body 13, there being a gas discharge passage 23 communicating between the socket 22 and the sleeve 18. An axial gas port 25 communicates between the bottom of the socket 22 and the bottle 10. The port 25 is of less diameter than the socket 22 so that a shoulder is formed at the bottom of the latter which is provided with a raised circular valve seat 24.

A cylindrical valve plug 26 of less diameter than the socket 22 is positioned within the latter and adapted to seat against the valve seat 24 therein. The plug 26 is provided with a guide boss 27 of reduced diameter which is fitted within a counter bore in the inner extremity of the passage 23 is the stem portion 21. The plug 26 is preferably formed of non-metallic, resilient material such as nylon or similar compressible material and a T-shaped gas passage 30 is formed in the plug 26 which communicates between the cylindrical external surface of the plug and the discharge passage 23. A resilient, elastic O-ring 29 of rubber, neoprene or similar material is tensioned about the boss 27 between the plug 26 and the stem portion 21 to prevent leakage between the valve body 13 and stem portion 21, and also between the stem portion 21 and the boss 27. A shoulder 28 is formed on the plug 26.

The relative lengths of the boss 27 and the counterbore in the passage 23 is preferably such that when the cap 16 is threaded onto the body 13, the stem portion 21 will move against the O-ring 29, to expand the latter before the bottom of the counterbore contacts the boss 27 to force the plug 26 into sealing engagement with the valve seat 24.

To discharge gas from the bottle 10, the cap 16 is slightly unscrewed to allow the gas pressure to force the plug 26 from its seat. The gas flows through the port 25, around the plug 26, and through the passage 30 and into the passage 23. The gas pressure maintains the O-ring 29 compressed so as to prevent leakage.

The valve body 13 is provided with a frangible disc 31 which is seated in the bottom of a threaded disc bore positioned to one side of the cap axis. The disc is formed from fusible, frangible material of sufficient thickness to withstand the pressure desired and is clamped in place in the bottom of the bore by means of a hollow set screw 32 of the "Allen" type. The disc serves to seal a safety valve passage 33 communicating through the body 13.

An access opening 34 is formed in the head of the cap 16 through which an "Allen" wrench may be inserted for removing or tightening the set screw 32. The access opening 34 also provides an escape for any gas discharging through a ruptured or leaking disc and the head of the cap provides a baffle to prevent a jet of escaping gas from injuring the hand of a user.

While a specific form of the improvement has been described and illustrated herein, it is desired to be understood that the same may be varied within the scope of the appended claim without departing from the spirit of the invention.

Having thus described the invention, what is claimed and desired secured by Letters Patent is:

A dispensing valve for pressure bottles of the type having an internally threaded filling neck, comprising: a circular valve body; a threaded nipple portion on said valve body; external threads formed on said valve body; an internally threaded, cup-shaped cap threaded onto said latter external threads; an axially positioned, stem portion formed on the internal surface of the head of said cap and slidably entering an axial valve socket formed in said body; a valve seat formed in said socket about a discharge port communicating through said nipple portion; a valve plug positioned in said socket, said plug being adapted to be forced toward said seat by said stem portion when said cap is rotated on its threads in one direction; a discharge passage communicating through said head and through said stem portion and through said plug with said socket; a safety valve passage formed in said body parallel to and eccentric of the axis thereof; a threaded bore in said body with which said safety valve passage communicates; a frangible disc in said bore closing said passage; and a hollow screw threaded in said bore against said disc, said cap having an access opening positioned to be brought into alignment with said hollow screw for access to the latter.

References Cited in the file of this patent

UNITED STATES PATENTS

| | | |
|---|---|---|
| 149,050 | Massey | Mar. 31, 1874 |
| 443,873 | Snow | Dec. 30, 1890 |
| 580,118 | Schrader | Apr. 6, 1897 |
| 1,158,420 | Kraft | Oct. 26, 1915 |
| 2,498,596 | Wallach | Feb. 21, 1950 |
| 2,715,908 | Huthsing | Aug. 23, 1955 |
| 2,796,080 | Presnell | June 18, 1957 |

FOREIGN PATENTS

| | | |
|---|---|---|
| 4,151 | Great Britain | of 1896 |
| 624,208 | France | Mar. 29, 1927 |
| 509,789 | Belgium | Mar. 31, 1952 |